United States Patent [19]
Moore et al.

[11] Patent Number: 5,201,106
[45] Date of Patent: Apr. 13, 1993

[54] APPARATUS AND METHOD OF THE CONTROL OF INSTALLING WEATHER STRIPPING IN A DOOR OR LIKE OPENING BY A ROBOT

[75] Inventors: George D. Moore, Oshawa; Thorsten Koseck, Courtice; William R. M. Ede, Oshawa, all of Canada

[73] Assignee: General Motors of Canada Limited, Oshawa, Canada

[21] Appl. No.: 876,999

[22] Filed: May 1, 1992

[51] Int. Cl.$^5$ .................. B23Q 17/00; B23P 11/02; B23P 19/02

[52] U.S. Cl. .................................. 29/407; 29/450; 29/235; 29/702; 29/703; 29/714; 29/717; 901/36; 901/37; 414/744.1; 414/786

[58] Field of Search .............. 29/450, 451, 417, 235, 29/701, 430, 702, 703, 709, 714, 717, 407; 269/56; 198/428, 617; 414/744.1, 225, 786; 901/41, 36, 31, 37, 26

[56] References Cited
U.S. PATENT DOCUMENTS

| | | | |
|---|---|---|---|
| 4,620,354 | 11/1986 | Hess et al. ........................ | 29/701 |
| 4,653,166 | 3/1987 | Bright .............................. | 29/451 |
| 4,715,110 | 12/1987 | St. Angelo et al. ............... | 29/701 |
| 4,760,636 | 8/1988 | St. Angelo, Jr. et al. .......... | 29/701 |
| 4,780,943 | 11/1988 | St. Angelo et al. ............... | 29/235 |
| 4,897,913 | 2/1990 | St. Angelo, Jr. et al. .......... | 29/450 |
| 4,996,756 | 3/1991 | Bright et al. ...................... | 29/243.58 |
| 5,068,952 | 12/1991 | Henner ............................. | 29/235 |

Primary Examiner—P. W. Echols
Assistant Examiner—David P. Bryant
Attorney, Agent, or Firm—Ernest E. Helms

[57] ABSTRACT

A robot for installing a fixed length of weather stripping in a body opening. The robot in a preferred embodiment includes an arm movable in a predetermined path, a powered variable angular displacement rate pressure roller mounted on the end of the arm for tracing the body opening and applying the fixed length to the opening, a calibration table for storage of preprogrammed datums for the pressure roller angular displacement rate and weather stripping feed rates for a plurality of locational segments along the body opening during an application cycle, a controller for delivering a signal representative of the calibration table preprogrammed datums to the pressure roller, an encoder for determining the actual angular displacement rate of the pressure roller, and an encoder for determining the actual feed rate of the weather stripping. The controller determines the differential in the actual weather stripping feed rate from the preprogrammed datum in the calibration tables for a first locational segment of the body opening and signals the pressure roller to modify the pressure roller rate of angular displacement to integrally compensate within a later segment for the weather stripping feed rate differential in the first segment and any intervening segments.

9 Claims, 6 Drawing Sheets

APPARATUS AND METHOD OF THE CONTROL OF INSTALLING WEATHER STRIPPING IN A DOOR OR LIKE OPENING BY A ROBOT

FIELD OF THE PRESENT INVENTION

The field of the present invention is that of an apparatus and method of controlling the installation of weather stripping in a door and like openings using a robot. The field of the present invention is also that of control of the end of arm tooling device (EOAT) for a robot which installs weather stripping in a door and like openings.

Excellent examples of robotic weather stripping systems are shown and described in the U.S. Pat. Nos. to St. Angelo et al, 4,897,913; 4,715,110; 4,760,636; and 4,780,943. The present invention provides various improvements to the robotic weather stripping system apparatus and methods described in the aforementioned patents, and the disclosure of the aforementioned patents are incorporated herein.

SUMMARY OF THE INVENTION

It is an object of the present invention to provide control of the end of arm tooling (EOAT) for a robot used for installing a loop or length of weather stripping into a body opening, the control including an electronically managed air-piloted proportional power valve that controls speed and torque of the aforementioned pressure roller.

It is an object of the present invention to provide control of the end of arm tooling (EOAT) for a robot used for installing a loop or length of weather stripping into a body opening, the control including the means to coordinate the robot motion to the speed and torque of the aforementioned pressure roller, and the application of the loop or length of weather stripping to the body opening.

It is an object of the present invention to provide control of the end of arm tooling (EOAT) for a robot used for installing a loop or length of weather stripping into a body opening, the control including the regulation of the speed and torque of the aforementioned pressure roller as required by dynamic response to natural variation of the robotic weather stripping application process.

It is an object of the present invention to provide control of the end of arm tooling (EOAT) for a robot used for installing a loop or length of weather stripping into a body opening, the control including the means for automatic learning, adjusting and maintaining the specification limits that ensure necessary feedrate of weather stripping has been achieved throughout the entire robotic weather stripping application process.

Other objects, desires and advantages of the present invention will become more apparent to those skilled in the art as the nature of the invention is better understood from the accompanying drawings and detailed description.

DETAILED DESCRIPTION OF THE DRAWINGS

Figure 1:
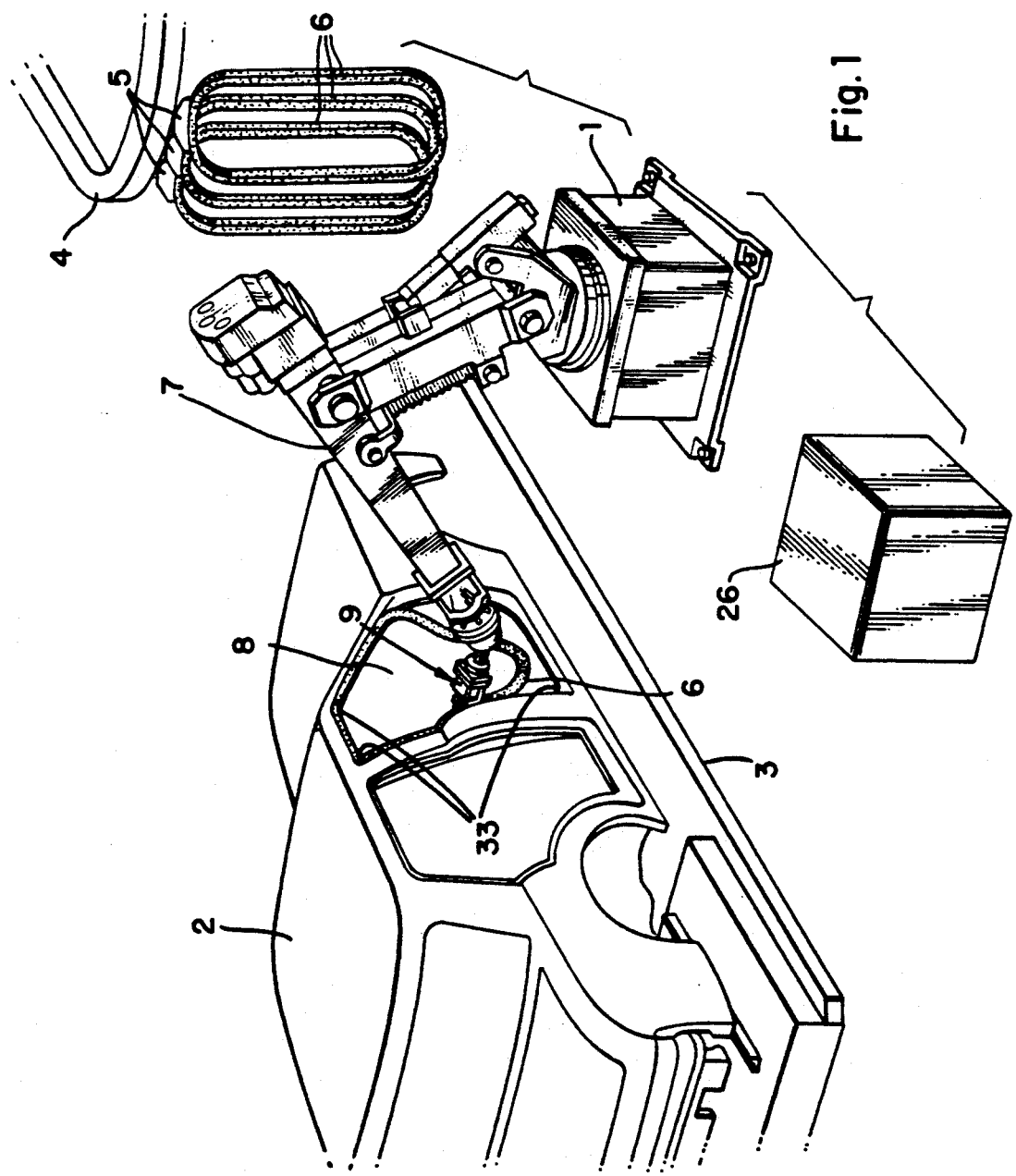
FIG. 1 is a perspective view of the robot of the present invention in a factory environment.

Referring to FIG. 1, a six-axis robot 1 is located adjacent the side of the vehicle body 2. The vehicle 2 is moved along on a conveyor line or by an automatic guided vehicle 3. A weather stripping loading station is provided by carousel or conveyor line 4 adjacent to the robot 1. The conveyor line 4 carries a series of presentation fixtures or hangers 5 on which are stored one separate fixed length closed loop of weather stripping 6. The robot 1, as will be described later, will load the weather stripping 6 from the conveyor line 4 and then transfer the weather stripping to the vehicle 2. The robot 1 will then install the weather stripping 6 therein.

At the end of a robotic arm 7 is an EOAT device 9 which allows the robot 1 to pick up the weather stripping 6 and affix the same into an opening 8.

Figure 2:
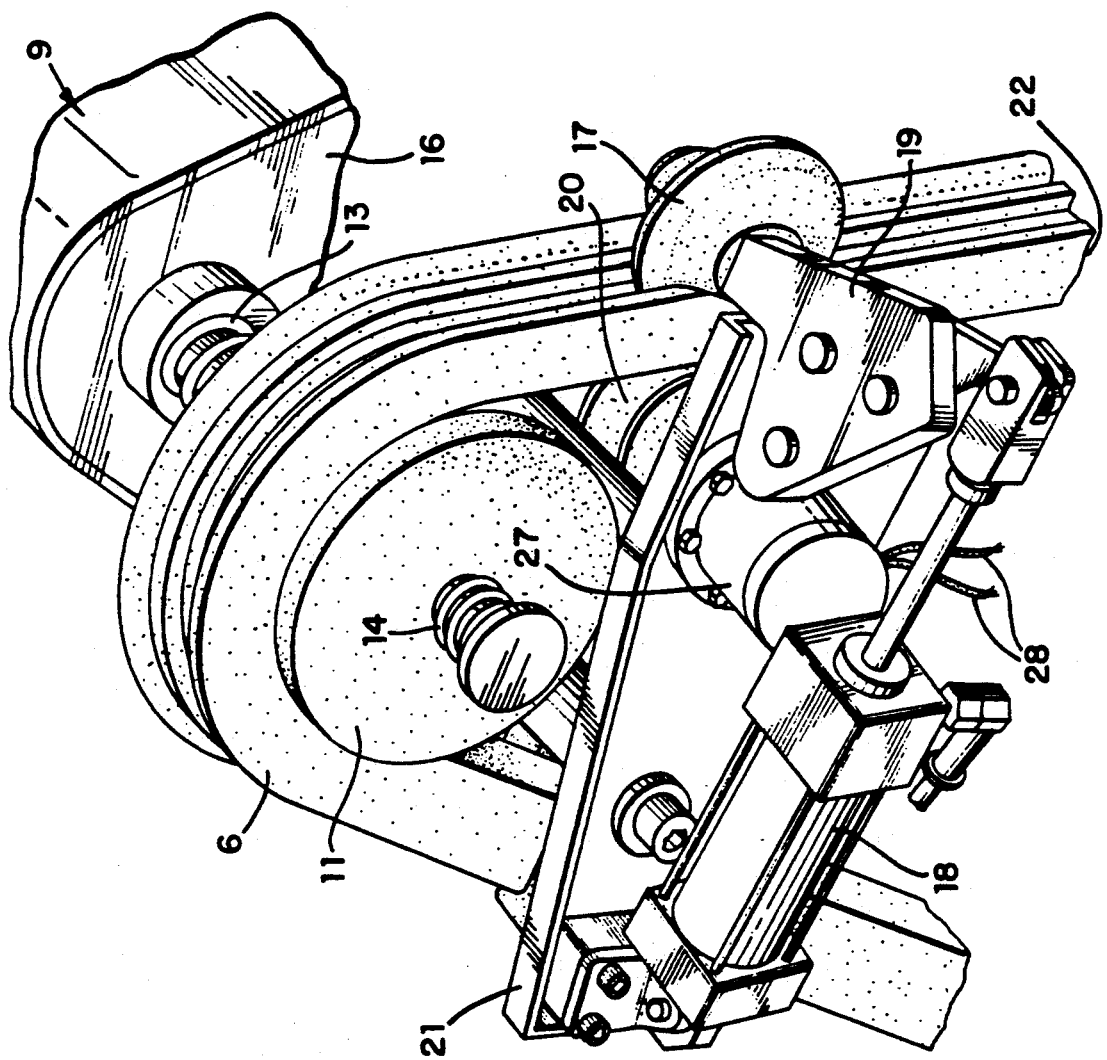
FIGS. 2, 3 and 4 are partial perspective views of the EOAT of the robot of the present invention demonstrating the function of the two encoders and related equipment.
Figure 3:
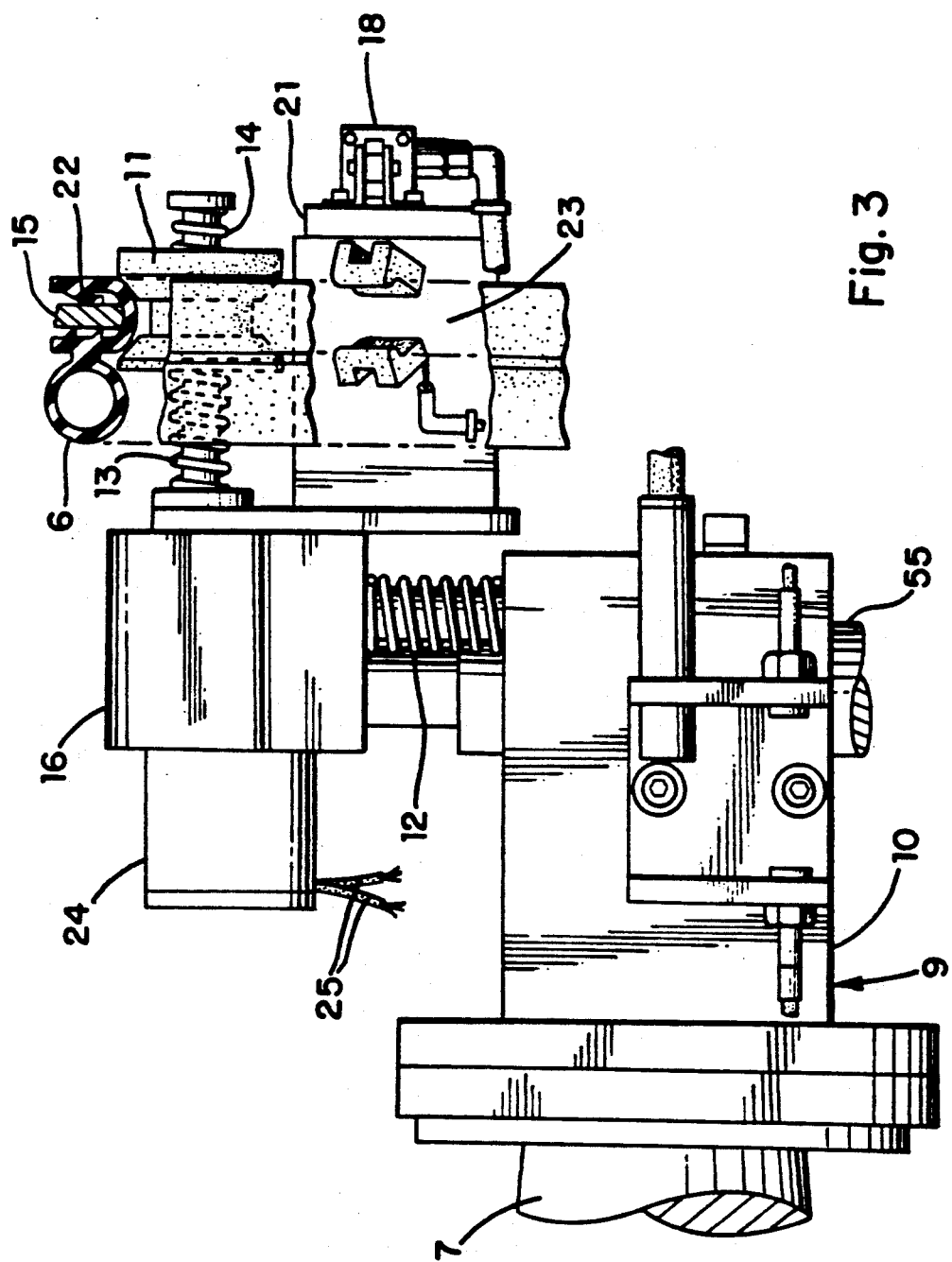
Figure 4:
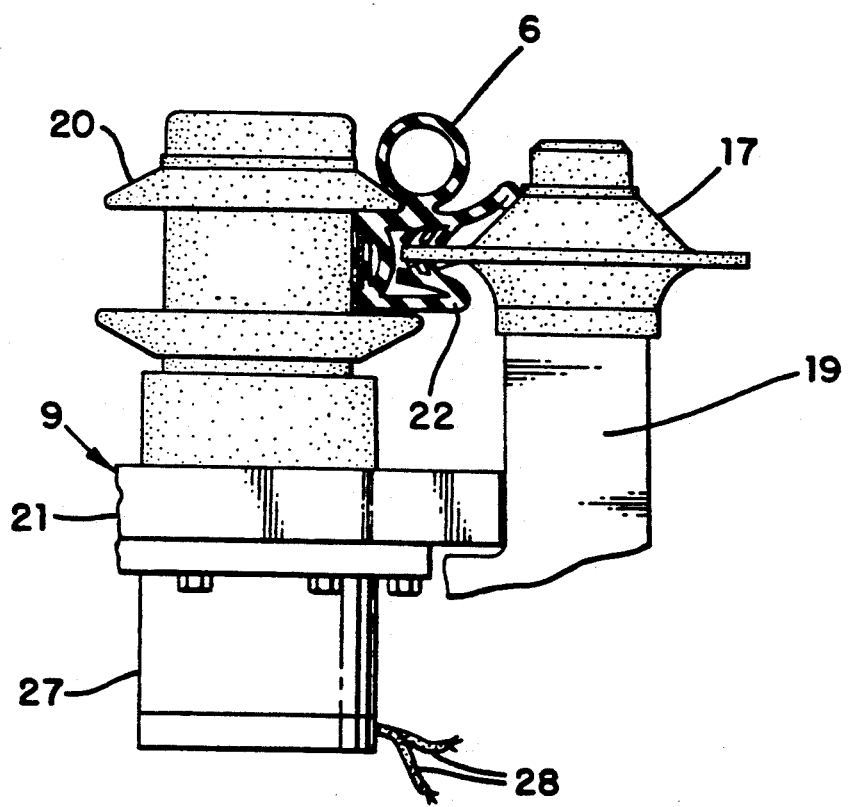

Referring to FIGS. 2, 3 and 4, the EOAT frame 10 has rotatably mounted thereon a pressure roller 11. The pressure roller 11 provides the means to guide and seat the weather stripping 6 to affix the weather stripping 6 to the vehicle opening 8. The pressure roller is powered for rotation and is provided with compliance in two perpendicular axes with respect to the robot arm 7 by springs 12, 13 and 14. The compliance is provided to allow for adjustment in the location of the opening flange 15. Also, the pressure roller 11 has a clutch 16 providing it with slip for the robot 1 to trace the vehicle opening 8 at a faster rate along the straight sections than the slower rate that the powered motor 55 turns the pressure roller 11 through the corners or curve-like sections.

To align the weather stripping 6 with the pressure roller 11 there is provided a guide roller 17. The guide roller 17 is also rotatably mounted to the EOAT frame 10. The guide roller 17 has a first position wherein it has a center blade engaged with the weather stripping 6 opposite the pressure roller 11. EOAT 9 has an air cylinder 18 and a pivotally connected lever 19 (FIG. 4) to translate the guide roller 17 to a second position out of engagement with weather stripping 6. The second position is provided to allow loading of the weather stripping 6. An air cylinder 18 and pivotally connected lever 19 are mounted to an attaching plate 21.

Opposite the weather stripping 6 from the guide roller 17 is an idler roller 20 mounted on the attachment plate 21. The function of the idler roller 20 is to cooperate with the guide roller 17 in alignment of the weather stripping 6 with the pressure roller 11.

After receiving a signal of the presence and location of the weather stripping 6, the robot 1 then positions the pressure roller 11 vertically upward to contact the weather stripping 6 with the carrier 22 of the weather stripping 6 away from the axial center of the pressure roller. The EOAT is then rotated to allow a gripper 23 to grab the weather stripping 6. The EOAT 9 is then rotated in the opposite direction to bring the idler roller 20 into contact with the weather stripping 6. An air cylinder 18 then activates the lever 19, translating the guide roller 17 to a position of engagement with the weather stripping 6. The robot 1 then moves the EOAT 9 away from the fixture 5.

The robot 1 then transfers the weather stripping 6 toward the opening 8. A carrier 22 of the weather stripping 6 is seated onto the body opening 8 flange by the robot 1 through the EOAT 9. Installation then proceeds in an upward direction along the front pillar of body opening 8. The robot 1 then causes the pressure roller 11 to trace the inner periphery of the door opening 8 along the flange guiding and affixing the carrier 22 of the weather stripping 6 to the flange of the opening 8 by applying force perpendicular to the flange. The force is applied at EOAT 9 by the robot 1, compressing springs 12 and 13. The above is achieved by software that directs the robot 1 to positions for the pressure roller 11 to contact the flange of the body opening 15, resulting in positive compression of the springs 12 and 13.

When installing fixed lengths, the pressure roller 11 will free wheel along the straight sections of the flange on the body opening 8, as the clutch 16 disengages the pressure roller 11. The rotational speed of the pressure roller 11 will largely be a function of the linear speed of the robot 1 (via the EOAT tool center point). As EOAT 9 approaches the corner 33, the tool center point is slowed down. The clutch 16 now engages the pressure roller 11 with its powered motor 55, and the pressure roller 11 obtains a rotational speed along the corner section wherein the pressure roller 11 affixes the weather stripping to the opening flange 15 in a linear compressed manner. Therefore, the slack in the weather stripping 6 is taken up where it is needed most, in the corner section. After leaving the corner, the clutch 16 again disengages and the pressure roller 11 again free wheels along the straight section as the EOAT tool center point linear speed returns to its higher state.

Due to disturbance torques and natural process variation, it is essential that feedback to the controller 26 is accomplished to allow dynamic control of the robot 1, powered motor 55 and pressure roller 11. Process variations include but are not limited to variances in the weather strip durometer, torsional rigidity, temperature of the weather strip and/or robot, and plant humidity. Another variable which can affect the process is that of the thickness of the metal which comprises the flange opening. Of the above-noted factors which have an effect upon the application of the weather stripping, the most important are the variances in longitudinal compression and torsional rigidity of weather stripping 6. Therefore, the controller 26 must respond dynamically by adjusting compression and torque against the weather stripping 6 through carrier 22 as it contacts the flange on body opening 15.

The feedback is accomplished at two pick-up points. First, an analog frequency encoder 24 is synchronized to the rotational speed of the pressure roller 11 mounted to EOAT 9. The rate of rotation of the pressure roller 11 is transmitted electrically through cable 25 to the controller 26. A second analog frequency encoder 27 is coupled to the idler roller 20 to free wheel against the weather stripping 6. The encoder 27 is mounted to an attachment plate 21 on EOAT 9. The encoder 27 will decipher the application or feed rate of the weather stripping 6 as the weather stripping 6 travels between idler roller 20 and guide roller 17. The feed rate is electrically transferred through cable 28 to controller 26.

Figure 5:
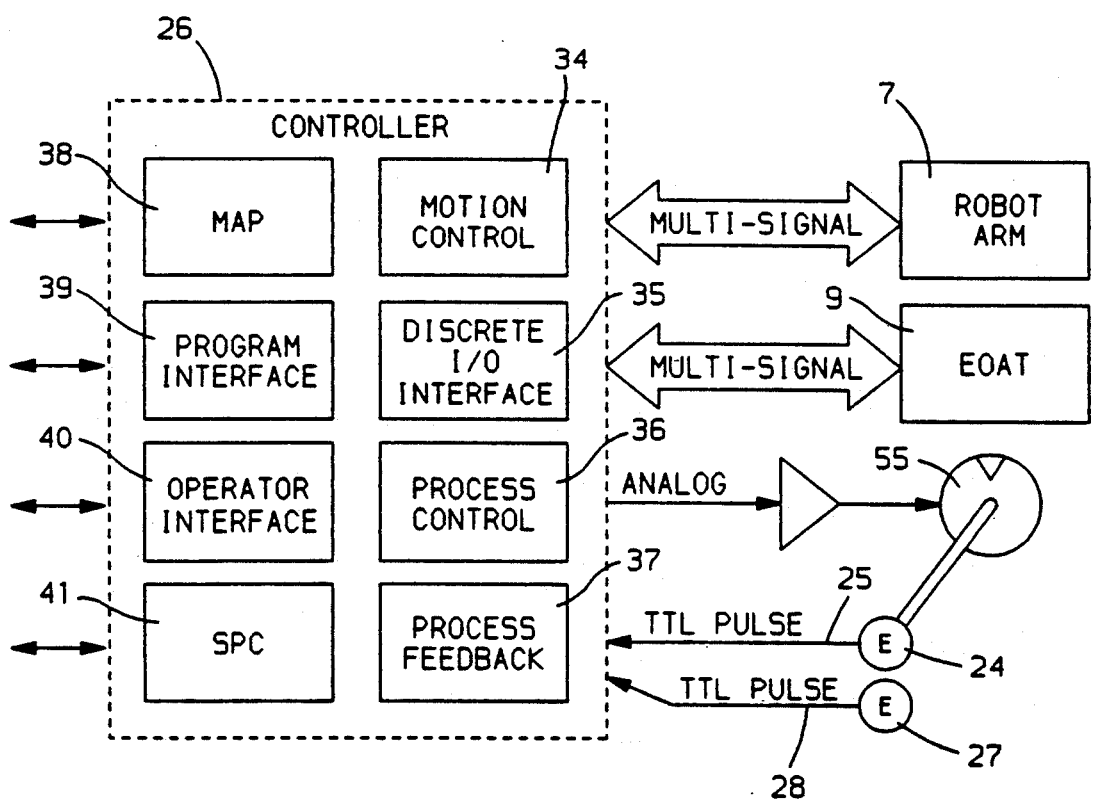
FIG. 5 is a block diagram depicting the interaction of components used to achieve feedback and control.

Referring to FIG. 5, the essential arrangement of components required to control the EOAT 9 for a robot used for installing a loop or length of weather stripping 6 into a body opening is shown. FIG. 5 depicts the nature of the process controller 26. The process controller 26 embodies the motion control 34 of the robot arm 7, the discrete input/output control 35 of the EOAT 9, the process control 36 of the pressure roller 11, the process feedback 37 from the encoder 24 and the encoder 27, the upload and download of software via Manufacturing Automation Protocol (MAP) 38, the addition of software via remote programming terminals 39, the input of control parameters, output of diagnostics and analysis through operator interface 40, and reporting of Statistical Process Control (SPC) 41.

Figure 6:
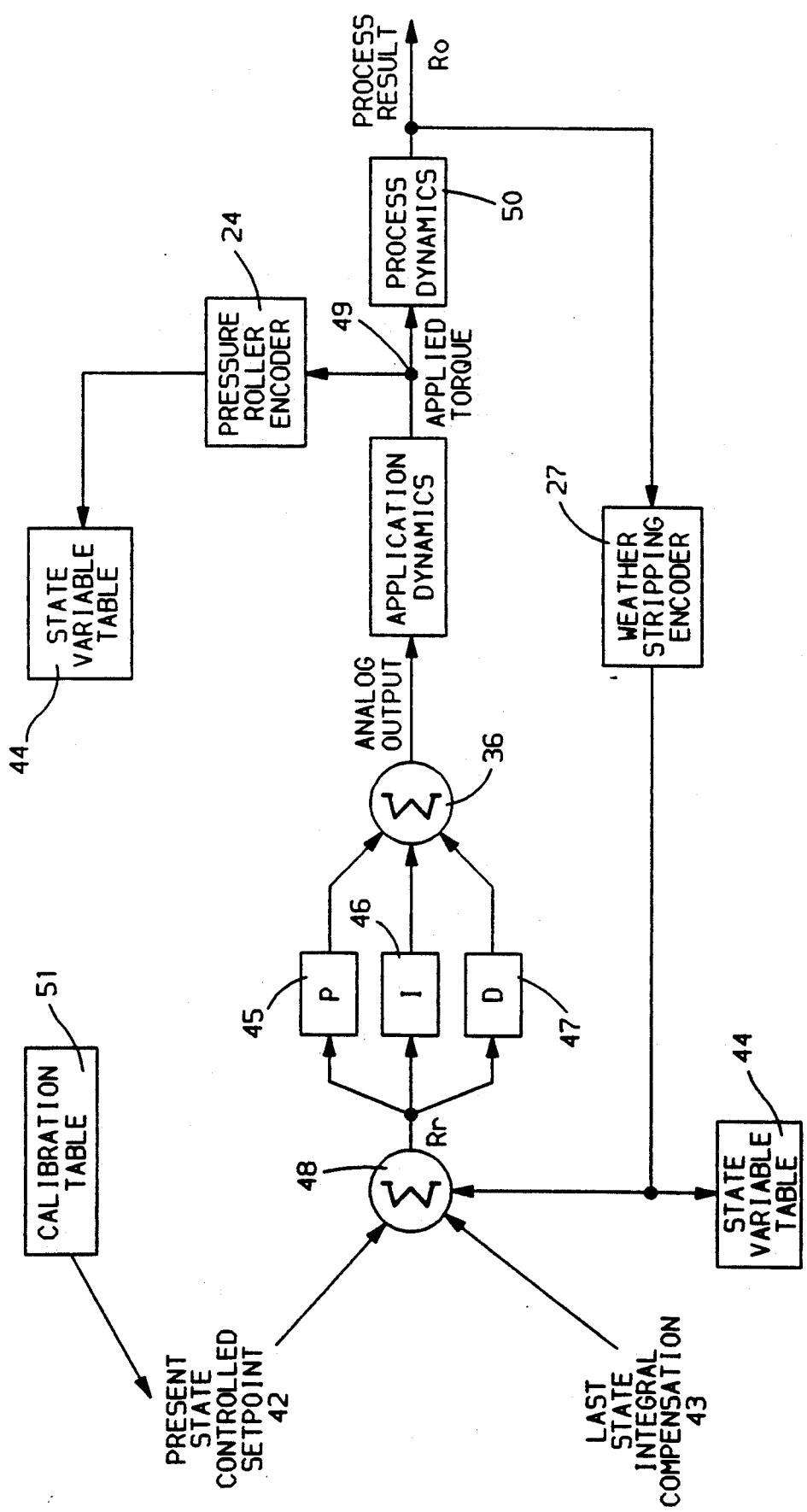
FIG. 6 is a control block diagram illustrating the control algorithm for application process.

The relation of the process feedback 37 to the process control 36 is depicted in FIG. 6. Referring to FIG. 6, the process control algorithm is illustrated in block diagram form. This process control algorithm is written in software to control the process of installing a loop or length of weather stripping 6 into the body opening.

The present invention provides a robot and method of application which provides two novel features in the application of weather stripping into the body openings. First of all, at various pre-programmed locational segments (referred to as a state) typically taken at a constant time interval in the neighborhood of 100 milliseconds, the controller 26 for the robot will have fed back to it the actual pressure roller 11 rotational speed and the actual feed rate for the last locational segment during the installation process. The controller 26 will be made cognizant from the frequency output by the encoders 24, 27 in such a manner that the controller 26 will be aware of whether or not the proper amount of weather stripping 6 was placed in the last locational segment. If, for instance, in the last locational segment an inappropriate amount of weather stripping 6 was affixed in the opening 8, the controller 26 will automatically attempt to compensate for the differential by either increasing or decreasing the weather stripping application rate by changing the motor speed of the pressure roller 11. If there is a feed rate deficiency in the first locational segment and if that segment is near a corner section and subsequently the pressure roller 11 is on a straight section, longitudinal compression of the weather stripping 6 may not be desirable. Therefore, the differential feed rate error will continually be fed back to the controller 26 until a locational segment is reached to where appropriate action can be taken by modifying the angular displacement rate of the pressure roller 11 to compensate for the prior error in the next earlier locational segment. Therefore, on each individual cycle, the system will automatically attempt to compensate for any error in weather stripping application rate in any locational segment regardless of the cause of that error. As previously mentioned, these errors are usually caused, by a particular weather strip having a different durometer, longitudinal compression, or stiffness from prior weather strips.

Second, in addition to compensating for error in a feed rate on a given cycle, whenever a feed rate error in a locational segment occurs, that error will be recorded in a state variable table 44. Subsequent errors in the same locational segment on later cycles will cause an automatic reprogramming of the pressure roller 11 speed such that on later cycles, the system will automatically compensate for prior errors in the first locational segment to try to diminish any need for compensation in later locational segments in the same cycle.

The compensation techniques utilized may be varied in that typically a rolling average of prior feed rate differentials may be utilized so that the controller 26 is not oversensitive to a one-time occurrence, but will gradually program the speed of the pressure roller to adapt the angular displacement rate in a certain locational segment whenever the occurrence continually occurs. Other functions based on prior feed rate differentials may be utilized. A balance is usually reached, for instance, in a sample of ten, between a desire for maximum response, which usually minimizes prior sample cycles, and stability, which typically maximizes the prior cycles considered. Whenever possible, compensation for feed rate error will be handled by adjustment of the angular displacement rate of the pressure roller 11; however, when adjustment of the displacement rate of the pressure roller 11 no longer suffices, the controller 26 will modify the speed of the robot arm to try to provide additional compensation capacity.

As mentioned previously, the process controller 26 algorithm (FIG. 6) is written in software. This process is described by a state function (locational segments).

The state is defined by robot arm position, robot speed and pressure roller speed and process environment variables that are linear relative to a period of time. When variation is introduced that forces a variable to become non-linear relative to a current period of time, the process translates into a new state to regain linearity by modifying pressure roller angular speed and in extreme cases additionally modifying robotic arm speed. To determine the state time period, it was decided to use 100 milliseconds. One hundred milliseconds is slightly more than the time it has been shown is required from when a signal can be given to the pressure roller 11 to achieve a given angular displacement rate and when that rate actually is accomplished. In empirical testing, it has been found that the minimal response time typically ranges from 52 to 96 milliseconds.

The variable angular rate air motor utilized is incremental in control but has approximately 65,536 speed increments which essentially make the pressure roller speed controllable in a virtually infinitely variable manner.

Each state period of 100 milliseconds allows the robot to travel a predetermined locational segment (note: the locational segments may vary in actual length). The total number of states equals the total process cycle (in seconds) divided by 100 milliseconds.

For every 100 milliseconds a new control rate set point is selected from the state variable table. [Initial pressure roller angular rate set points (datums) are input by feedback from the pressure roller encoder 24 during a calibration cycle. The initial datums are stored in the calibration table 51 and will be present in the first application cycle for the system in the present state controlled set point.]

Rn = rate selected for state n from state variable table

T = upon entering a state, each state is 100 msec $$N = \text{number of states} = \frac{\text{(Total Process Cycle)}}{T} = \frac{C}{T}$$

where n = present state number from 1 to N for time C

The present state-controlled setpoint 42 is selected from the calibration library or table 51. As mentioned previously, the calibration library or table 51 is derived prior to the production process to ensure accurate initial datum values or setpoints are available at the first production process. Subsequent processes will benefit from setpoint values that will be fine tuned on a continual basis as the controller 26 updates the state variable library 44 and the calibration library or table 51. Every 100 milliseconds a new control rate setpoint is selected from the state variable table 44 (or calibration table 51 if the robot is on the first application cycle) for the next locational segment.

Rn = angular rate of the pressure roller 11 selected for state n from state variable table 44.

The resultant rate 48 is a summation of the present state controlled setpoint 42 and the last state integral compensation 43. The last state integral compensation 43 is a residual error (or differential in the actual weather stripping feed rate from the value stored present state controlled setpoint) from the previous state that is carried over into the present state and applied as an integral term. The last state integral compensation is ΔR (cumulative error portion)

ΔR = Ln−Lact where: Ln is the weather stripping length set point for state n from the state variable table 44. Lact is the weather stripping length actually applied up to state n (as input by the idler roller encoder 27).

Therefore, the New Rate = R = Rn + ΔR = set point rate + last state integral compensation The controller applies integral and proportional gains to the New Rate (R) to overcome natural damping and following error [for example, when the natural damping factor (D) is D − P − (P − Ract) (1 − t/2), the integral correction (X) is X = R + (P − Ract)/(1 − t/2) where Ract is the actual input pressure roller rate, P = K * R is the proportional term, K is the overall gain adjustment, R is the calculated New Rate, and t is the response time of the control system). The final result then determined is converted to an analog output command voltage that changes the rotational speed of the pressure roller for the next locational segment (if a proportional pneumatic valve is used, the output rate is $$Y = A0 + A1(X) + A2(X^2) + A3(X^3) + A4(X^4)$$

where Y is the analog output in millivolts, X is the resultant digital rate as calculated, and A0, A1, A2, A3 and A4 are experimentally determined coefficients).

The present invention has lowered the previous scrap rate from approximately 5–2 percent to virtually zero. Additionally, if a large discrepancy should occur in the weather stripping length beyond the capabilities of the automatic control system, the robotic cell operator can adjust the system proportionally to install greater length of weather stripping to compensate across the whole application cycle. This modification will be rarely required.

The present invention is being described in regard to automotive vehicle body openings; however, the various applications of the present invention extend beyond automotive vehicle body applications.

An embodiment of the present invention has been explained. However, it will be readily apparent to those skilled in the art of the various modifications which can be made to the present invention without departing from the spirit and scope of this application as it is encompassed by the claims.

The embodiments of the invention in which an exclusive property or privilege is claimed are defined as follows:

1. A robot for installing a fixed length of weather stripping stored in a loading station into a body opening, the robot in combination comprising:

an arm movable in a predetermined path in at least two axes;

a powered pressure roller rotatively mounted on the end of the arm and moved by the arm for tracing the opening of the body and guiding and applying the fixed length, whereby the fixed length is affixed to the opening of the body, the pressure roller having a variable angular displacement rate;

calibration table means for storage of preprogrammed datums for the pressure roller angular displacement rate and weather stripping feed rates for a plurality of locational segments along the opening of the body during a weather stripping application cycle;

means for delivering a signal representative of the calibration table means preprogrammed datums to the pressure roller;

means for determining the actual angular displacement rate of the pressure roller;

means for determining the actual feed rate of the weather stripping;

means for determining the differential in the actual weather stripping feed rate from the preprogrammed datum in the calibration tables for a first locational segment of the body opening; and means for signaling the pressure roller to modify the pressure roller rate of angular displacement to integrally compensate within a later segment for the weather stripping feed rate differential in the first segment and any intervening segments.

2. An apparatus as described in claim 1 further comprising state variable table means to store prior weather stripping feed rate differentials in previous weather stripping application cycles in the first locational segment and means to change the preprogrammed datum for the pressure roller angular displacement rate to restore the weather stripping feed rate in the first segment to its preprogrammed datum.

3. A robot as previously described in claim 2 wherein the means to change the preprogrammed datum is based upon a function of the feed rate differentials of the first segment in a predetermined number of prior weather stripping application cycles.

4. A robot as described in claim 1 further including means to modify a rate of movement of the robotic arm to compensate for the feed rate differential experienced in the first locational segment in a later locational segment of the weather stripping application cycle.

5. A robot as described in claim 2 with means to modify a rate of movement of the robotic arm movement to restore the actual weather stripping feed rate in a later application cycle in the first locational segment to the preprogrammed weather stripping feed rate.

6. A robot as described in claim 1 further comprising:

an idler roller engaged with the weather strip with a frequency encoder to provide an electrical signal to determine the feed rates of the weather strip, and a frequency encoder associated with the pressure roller to provide an electric signal representation of the rate of angular displacement and means for breaking down such electrical signals in a PID controller before signaling the pressure roller to compensate at a later locational segment for the weather stripping feed rate differential experience in the first locational segment.

7. A robot for installing a fixed length of weather stripping into a body opening, the robot in combination comprising:

an arm movable in a predetermined path along at least two different axes;

a powered pressure roller rotatively mounted on the end of the arm and moved by the arm for tracing the opening of the body and guiding and applying the fixed length, whereby the fixed length is affixed to the opening of the body, the pressure roller having a variable angular displacement rate;

an idler roller supporting the fixed length and rotationably engaged therewith;

calibration table means for storage of preprogrammed datums for the pressure roller angular displacement rate and weather stripping application rates for a plurality of locational segments along the opening during a weather stripping application cycle, means for delivering a signal representative of the calibration table means preprogrammed datums to the pressure roller;

a pressure roller encoder for determining the actual angular displacement rate of the pressure roller and providing a signal representative thereof;

an idler roller encoder means for determining the actual feed rate of the weather stripping and providing a signal representative thereof;

means for determining the differential in the actual weather stripping feed rate of the weather strip from the preprogrammed datum in the calibrational tables for a first locational segment;

means for signaling the pressure roller to modify the rate of angular displacement to integrally compensate within a later locational segment for the differential in the weather stripping feed rate in the prior first segment and any intervening locational segments; and state variable table means to store the prior differential in weather stripping feed rates of previous weather stripping application cycles in the first locational segments and means to change the preprogrammed datum for the pressure roller angular displacement rate to restore the weather stripping feed rate in the first locational segment to its preprogrammed datum, and wherein the change of the preprogrammed datum of the pressure roller angular displacement rate is based upon a rolling average of the feed rate differentials experienced in the first locational segment in a predetermined number of application cycles.

8. A method of utilizing a robot having an arm and a pressure roller having a variable rotational velocity to install fixed lengths of weather stripping into a body opening including generally straight sections and corner sections, by interacting and tracing the pressure roller along a straight section of the opening at a first linear speed and at a first rotational speed and interacting and tracing the pressure roller along a corner section at a second linear speed differing from the first linear speed and at a second rotational speed differing from the first rotational speed, whereby the fixed length is guided and affixed with the sections as the fixed length is installed into the body opening and the relative velocity of a point on a periphery of the pressure roller relative to a point on the body opening in the corner section is such that the weather stripping is longitudinally compressed in the corner section, the method comprising:

storing preprogrammed datums for the pressure roller rotational velocity and weather stripping feed rate for a plurality of locational segments along the opening in a calibration table means;

delivering a signal representative of the calibration table means preprogrammed datums to the pressure roller to command the pressure roller's rotational velocity;

determining the actual rotational velocity of the pressure roller and the actual weather stripping feed rate;

determining the differential in the feed rate of the weather stripping from the preprogrammed datum in the calibration table means for a first locational segment; and signaling the pressure roller to modify the rotational velocity to integrally compensate within a later locational segment for the differential in the first locational segment and any intervening locational segments.

9. A method as described in claim 8 further comprising storing in a state variable table the prior differentials in the weather stripping feed rate in previous weather stripping application cycles in the first locational segments and changing in subsequent application cycles the programmed data for the pressure roller rotational velocity to restore the weather stripping feed rate in the first locational segment to its preprogrammed datum.

* * * * *